(12) United States Patent
Skjaerbaek et al.

(10) Patent No.: US 11,655,799 B2
(45) Date of Patent: May 23, 2023

(54) WIND TURBINE

(71) Applicant: Siemens Gamesa Renewable Energy A/S, Brande (DK)

(72) Inventors: Poul Skjaerbaek, Videbaek (DK); Johnny Soerensen, Videbaek (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/188,254

(22) Filed: Mar. 1, 2021

(65) Prior Publication Data

US 2021/0277872 A1 Sep. 9, 2021

(30) Foreign Application Priority Data

Mar. 3, 2020 (EP) .................................... 20160776

(51) Int. Cl.
| | |
|---|---|
| *F03D 13/20* | (2016.01) |
| *F03D 80/80* | (2016.01) |
| *E04H 12/08* | (2006.01) |
| *E04H 12/34* | (2006.01) |

(52) U.S. Cl.
CPC ........... *F03D 13/20* (2016.05); *E04H 12/085* (2013.01); *E04H 12/342* (2013.01); *F03D 80/85* (2016.05)

(58) Field of Classification Search
CPC .............................. E04H 12/085; E04H 12/342
USPC .......................................... 52/848; 416/244 R
See application file for complete search history.

(56) References Cited

U.S. PATENT DOCUMENTS

| | | | | |
|---|---|---|---|---|
| 211,291 | A * | 1/1879 | Beach ................. | E04F 11/1842 52/832 |
| 232,360 | A * | 9/1880 | Milliken ................. | E04H 12/08 52/848 |
| 415,325 | A * | 11/1889 | Greene ................... | E04H 12/08 52/848 |
| 1,258,839 | A * | 3/1918 | Wheeler ................. | E02D 29/12 52/223.3 |
| 3,936,206 | A * | 2/1976 | Meisberger ............. | E04H 12/08 403/334 |
| 5,090,837 | A * | 2/1992 | Mower ................. | F16B 7/0413 403/361 |
| 5,632,129 | A * | 5/1997 | Imai ...................... | E04B 1/3211 403/171 |

(Continued)

FOREIGN PATENT DOCUMENTS

| | | | |
|---|---|---|---|
| DE | 102007020483 A1 | 10/2008 | |
| EP | 1544460 A2 * | 6/2005 | ........... E04H 12/085 |

(Continued)

OTHER PUBLICATIONS

European Search Report dated Sep. 4, 2020 for application No. 20160776.9.

*Primary Examiner* — Brian D Mattei
*Assistant Examiner* — Joseph J. Sadlon
(74) *Attorney, Agent, or Firm* — Schmeiser, Olsen & Watts LLP

(57) ABSTRACT

Provided is a wind turbine, with at least one hollow construction including at least two longitudinal hollow elements each having a connection interface for connecting the elements either by a slip joint connection or by a flange connection especially a tower including at least two hollow tower elements, wherein at least one connector is guided through the slip joint or flange connection from an inner space to the outer of the wind turbine.

6 Claims, 5 Drawing Sheets

(56) References Cited

U.S. PATENT DOCUMENTS

Figure 1:
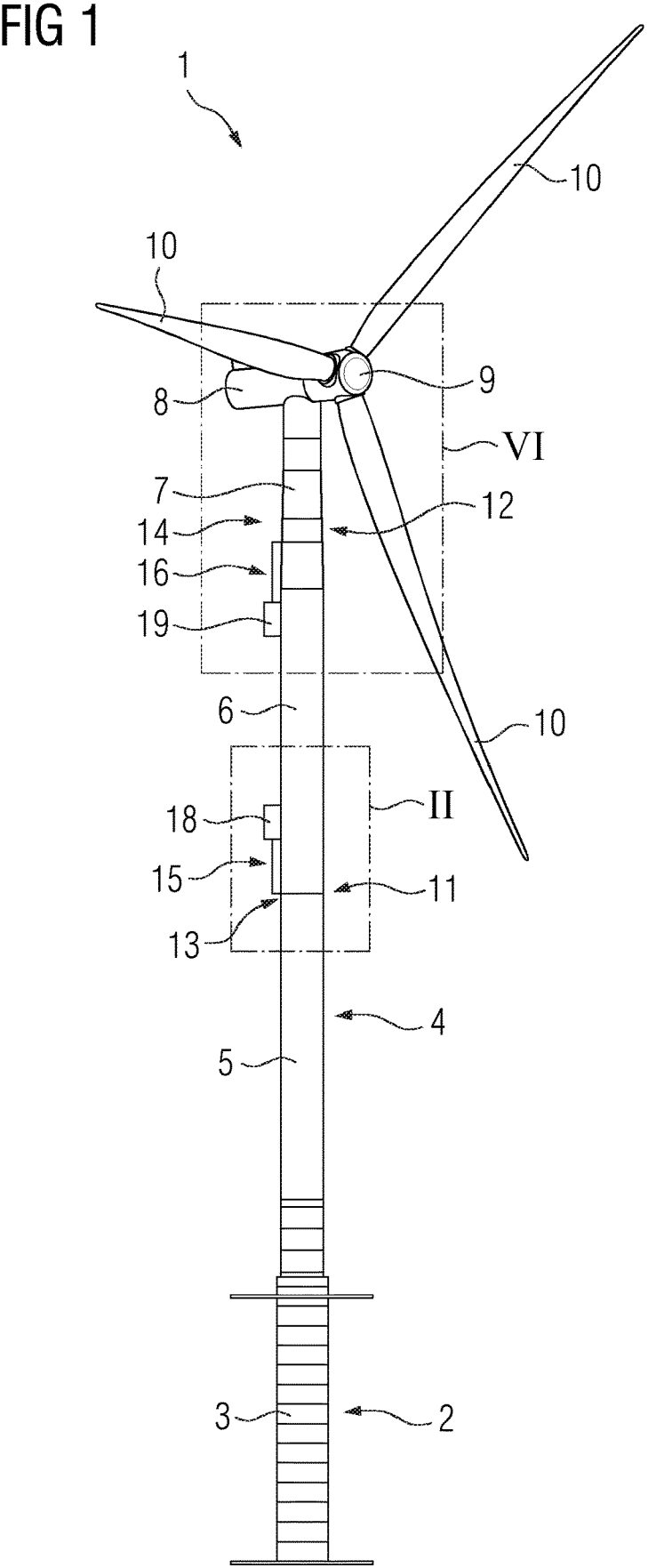

| | | | | |
|---|---|---|---|---|
| 5,809,711 A * | 9/1998 | Werner | ............... | E04H 12/16 52/223.2 |
| 6,191,355 B1 * | 2/2001 | Edelstein | ............... | E04H 12/08 174/45 R |
| 7,309,092 B2 * | 12/2007 | Garceau | ............... | B60P 3/34 296/171 |
| 7,448,169 B2 * | 11/2008 | Maliszewski | ............... | E04H 9/10 52/301 |
| 7,628,869 B2 * | 12/2009 | Martin | ............... | C22C 38/06 52/848 |
| 7,752,824 B2 * | 7/2010 | Brown | ............... | F16B 21/16 52/223.13 |
| 8,056,296 B2 * | 11/2011 | Cairo | ............... | E04H 12/185 52/651.07 |
| 8,650,820 B2 * | 2/2014 | Bocquet | ............... | E04C 5/127 52/745.19 |
| 8,713,859 B2 * | 5/2014 | Mercado Diez | ............... | E04H 12/00 52/126.3 |
| 8,935,889 B2 * | 1/2015 | Samuelsen | ............... | F03D 80/00 52/745.04 |
| 8,950,127 B2 * | 2/2015 | Yakoub | ............... | E04H 12/00 52/750 |
| 9,163,613 B2 * | 10/2015 | Martínez de Castañeda | ............... | F03D 13/10 |
| 9,175,492 B2 * | 11/2015 | Garcia Maestre | ............... | F03D 13/20 |
| 9,255,395 B2 * | 2/2016 | Kosuri | ............... | E04B 1/40 |
| 9,388,598 B2 * | 7/2016 | Stiesdal | ............... | E04G 21/0445 |
| 9,689,175 B2 * | 6/2017 | Zavitz | ............... | F03D 80/60 |
| 9,771,700 B2 * | 9/2017 | Bleasdale | ............... | F03D 13/22 |
| 9,777,589 B2 * | 10/2017 | Schleif | ............... | F01D 17/06 |
| 10,145,138 B2 * | 12/2018 | Pedersen | ............... | F03D 13/40 |
| 10,738,431 B2 * | 8/2020 | Dallinger | ............... | E02B 17/0004 |
| 10,954,686 B2 * | 3/2021 | Chase | ............... | E04H 12/16 |
| 11,002,253 B2 * | 5/2021 | Könitz | ............... | F03D 13/20 |
| 11,421,809 B2 * | 8/2022 | Pearse | ............... | B61B 13/10 |
| 2005/0078049 A1 * | 4/2005 | Trankina | ............... | H01Q 1/1242 343/890 |
| 2005/0166521 A1 * | 8/2005 | Silber | ............... | E04H 12/10 52/651.01 |
| 2012/0110927 A1 * | 5/2012 | Liestenfeltz | ............... | E04H 12/182 60/320 |
| 2013/0177445 A1 * | 7/2013 | Stiesdal | ............... | F03D 13/25 416/244 R |
| 2013/0214538 A1 * | 8/2013 | Himmelmann | ............... | F03D 80/85 290/55 |
| 2013/0224020 A1 * | 8/2013 | Dagher | ............... | F03D 13/25 416/84 |
| 2020/0173420 A1 * | 6/2020 | Petersen | ............... | F03D 13/20 |

FOREIGN PATENT DOCUMENTS

| | | | | |
|---|---|---|---|---|
| EP | 1544460 A2 | 6/2005 | | |
| EP | 2077363 A2 * | 7/2009 | ............ | E04H 12/085 |
| EP | 3088637 A1 * | 11/2016 | ............ | E04H 12/08 |
| EP | 3088637 A1 | 11/2016 | | |
| EP | 3443224 A1 | 2/2019 | | |
| JP | 2010150985 A * | 7/2010 | ............ | E04H 12/085 |
| WO | WO-2006077084 A1 * | 7/2006 | ............ | F03D 80/10 |
| WO | WO2017178657 A1 | 10/2017 | | |
| WO | WO-2018139929 A1 * | 8/2018 | ............ | E02B 17/02 |
| WO | WO 2019073060 A2 | 4/2019 | | |

* cited by examiner

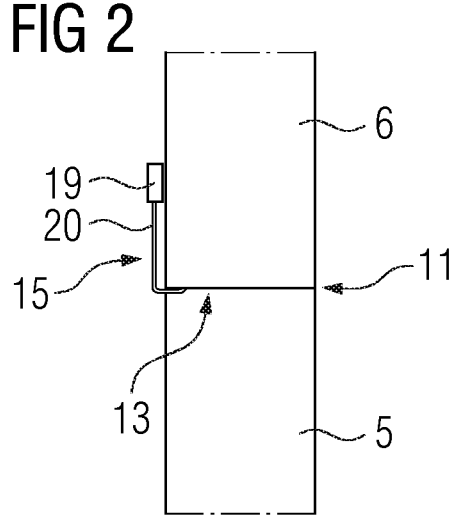
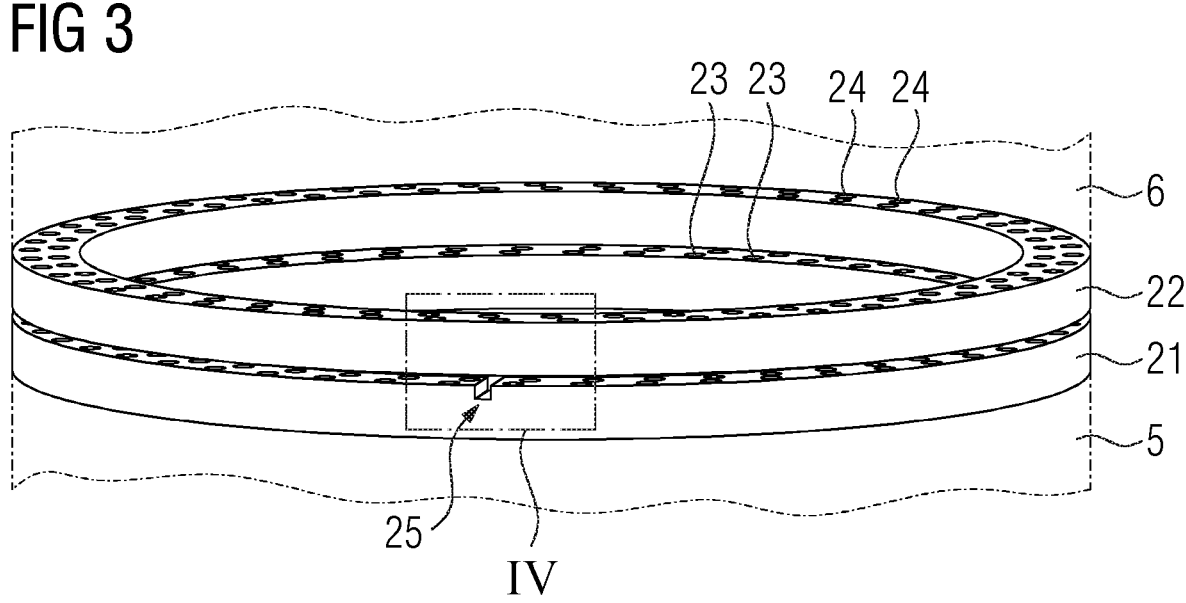

WIND TURBINE

CROSS-REFERENCE TO RELATED APPLICATIONS

This application claims priority to European Application No. 20160776.9, having a filing date of Mar. 3, 2020, the entire contents of which are hereby incorporated by reference.

FIELD OF TECHNOLOGY

The following relates to a wind turbine, with at least one hollow construction comprising at least two longitudinal hollow elements each having a connection interface for connecting the elements either by a flange connection or by a slip joint connection, especially a tower comprising at least two hollow tower elements.

BACKGROUND

A modern wind turbine usually comprises several longitudinal hollow constructions, the most prominent of which is the relatively high tower built of several tower elements or tower segments, which are stacked on site when erecting the tower. For fixing two tower elements to each other each tower element comprises a specific connection interface. The element connection is realized by the connection interfaces. The connection may be a slip joint connection. The connection interfaces are conical, with the one conical connection interface engaging the other conical connection interface. This slip joint connection is a quite simple connection type, as no additional bolts or the like are used. The fixation is friction-based. Another connection type is the flange connection. Here both elements comprise respective flanges, which, when the elements are fixed to each other, are in direct contact. Each flange comprises a number of through bores, in which respective fixation bolts are inserted. These types of connections can also be found elsewhere at the wind turbine, as hollow constructions comprising two or more longitudinal hollow elements are used for building various turbine sections. An example is the turbine foundation, which can be built from hollow jackets.

Usually at the outside of the tower or of another hollow construction one or more specific equipment components are arranged, which are connected via a connection means like a cable or the like to another component arranged in the inner of the tower respectively the hollow construction. Therefore, the respective connection means like the cable is guided within the tower to a transition area, where the connection means is guided from the inside to the outside and finally is guided to the component. This component may for example be a lighting device like a flash light, a sensor device for measuring any relative parameter or any other external component, which either needs an electronic supply or connection or a liquid connection like the supply of a cooling means or a hydraulic oil or the like.

For guiding the respective connection means from the inside to the outside of the hollow construction respectively the tower the wall of the hollow element respectively the tower element is penetrated by drilling a respective hole directly in the wall. As the wall respective the element is weakened in this area due to the drilled hole, reinforcement means like a reinforcement plate surrounding the hole is attached to the wall, usually to the inner side of the hollow element wall by usually welding it to the wall. Any welding to the steel structure of the tower element however weakens this structure again, and is therefore not desirable.

SUMMARY

An aspect relates to an improved wind turbine.

For solving the problem, a wind turbine, with at least one hollow construction comprising at least two longitudinal hollow elements each having a connection interface for connecting the elements either by a slip joint connection or by a flange connection, especially a tower comprising at least two hollow tower elements, is characterised in that at least one connection means is guided through the slip joint or flange connection from an inner space to the outer of the wind turbine.

According to embodiments of the invention, the connection area, in which both elements are connected either by a slip joint or a flange connection, is not only used as the connection site, but also as the area where the connection means is guided from the inside to the outside of the hollow construction respectively the tower. In the following the description refers to a tower and tower segments, although the whole disclosure also refers to any other hollow construction comprising longitudinal hollow construction elements. As in this area the respective connection interfaces are arranged and are adjacent to each other, either both connection interfaces for realising the slip joint connection or both interfaces for realising the flange connection, this area is mechanically extremely stable, so that the integration of the at least one connection means is possible without influencing the stability of any of the elements respectively the connection itself. Even if any mechanical arrangements like through bores are provided in the respective connection, what is, as will be explained below, not necessary, this would not negatively influence the mechanical stability, and due to the adjacent or overlapping connection interfaces a very high stability in this area is given. The respective slip joint or flange connections advantageous allow the arrangement of the connection means without drilling any through holes or, if any mechanical modification is necessary, this modification is neglectable regarding the stability of the element respectively connection.

As mentioned above, one type of element connection is the slip joint connection. Such a wind turbine having elements connected by a slip joint connection is characterised in that the connection interfaces for establishing a slip joint connection are conical connection interfaces, and that at least one intermediate flexible mat-like means is arranged between the adjacent connection interfaces, through which the connection means is guided. As already explained, both elements comprise respective conical connection interfaces, with the one connection interface engaging into the other connection interface, which radially surrounds the inner connection interface. According to embodiments of the invention at least one intermediate flexible mat-like means is arranged between both adjacent connection interfaces. This flexible mat-like means, which may be a one-piece conical mat element, or which may comprise two or more separate mats arranged in a circular arrangement, is inserted between the connection interfaces to seal the connection and/or to compensate small tolerance differences between the two parts to be joint. So, the mat-like means distances or spaces the connection interfaces a little bit in a radial direction. This small space allows the integration of the connection means between both conical connection interfaces respectively surfaces, so that the connection means is directly guided between these interfaces from the inside to the outside without the need of drilling any hole in these connection parts or interfaces. As usually the conical connection interface of the lower element engages in the conical connection interface of the upper element, the connection means like the cable or a liquid pipe, which is guided in the inner of the tower, is guided to the upper end of the conical ring space and guided into this space. It runs through this space to the lower end of this conical ring space, where it exits to the outside and is finally guided to the component arranged at the outside of the tower. So, this inventive way of connection respectively guidance of the connection means does not need any specific mechanical adaption like the provision of bores or the like, as a given small ring space between the connection interfaces is used for accommodating the connection means in this connection area.

The mat-like means, for example the one-piece conical and ring-shaped mat element, extends along at least half of the length of the overlapping area, along which the connection interfaces overlap, at least over two third of this overlapping area and desirably it extends along the whole overlapping area.

As already mentioned, the mat-like means or device extends around the circumference of the connection interface. It may be a one-piece mat-like means, which is already worked to a closed conical 360° ring form, so that it can be slipped over the conical connection interface. It may also be slitted, so that a small slit is realized between the adjacent edges. In an alternative the mat-like means may comprise two or more mat elements arranged equidistant around the circumference of the connection interfaces. In this case for example four mat elements extending around 60° are for example glued to the connection interface with a space of 30° between two adjacent mat elements.

If a mat-like means extending around the circumference is used, this is, as mentioned, a conical ring-shaped means or device. In an alternative the mat-like means may also comprise two or more mat elements which are arranged in a ring form with their edges abutting each other.

Regarding the integration of the connection means or connector in the space between the adjacent conical connection interfaces, two alternatives are given. According to a first alternative the connection means or connector is integrated into the mat-like means. Here the connection means is directly arranged or fixed or embedded in the mat-like means. In an alternative the connection means may also be arranged in a space or slit between adjacent ends of the mat-like means or of two adjacent mat elements. As mentioned above, it is possible that the mat-like means is slitted or that a slit is provided between adjacent mat elements. This slit or space may be used to accommodate the connection means. So here the connection means is not integrated respectively is not a part of the mat-like means.

The connection means may comprise a cable, which either is directly inserted in the mat-like means or in a channel formed in the mat-like means or in the space or slit between two adjacent ends or edges of the mat-like means or of the mat elements. According to this embodiment, the cable, which may be an electric cable, or which may be a pipe-like cable for providing any liquid or the like, is directly arranged in the mat-like means or in the space or slit. In an alternative it is also possible to integrate a hollow pipe as a connection means in the mat-like means or in the space, in which pipe the cable, in this case an electric cable, or the liquid pipe is inserted. This hollow pipe acts as a protection means or protector for protecting the inserted cable or hollow pipe in view of any loads resting on the connection, which loads may arise in the operation of the wind turbine due to varying wind loads, wave movement, vibrations etc.

The outer diameter of the connection means, especially of the cable or the pipe, is smaller than the thickness of the mat-like means. This is also advantageous to avoid any loads negatively influencing the connection means. In this circumstance it is also possible that the cable or the pipe are made of or comprise a flexible material that can be compressed to a certain extend without damaging it and without influencing its function in a negative way.

The connection means is pre-installed in the flexible mat-like means when it is directly inserted into this mat-like means. According to this embodiment of the invention a pre-fabricated mat-like means already comprising the integrated, e.g., embedded connection means like the integrated cable or the hollow pipe is used. The mat-like flexible means or device may be made of or comprise any suitable elastic material, a polymer material, especially a thermoplastic or elastomeric polymer material, like polyurethane, rubber polyethylene, polyamide or the like, which listing is not restricting, as any suitable flexible or elastic material having long-lasting properties and a good wear resistance may be used. When producing this mat-like means especially using polymer material, it is easily possible to integrate or embed the connection means. The mat-like means or the mat elements comprise at least one layer of an elastic material. The term "mat" comprises any kind of larger, flat item, which may be made of a bulk material, but which may also be made of a woven or knitted or foamed material. The elastic material may be provided as a single layer, which is advantageous especially when a bulk material is used, but it may also be a multi-layer arrangement comprising several layers of the elastic material stacked upon each other, for example when the respective layers are made of woven or knitted material etc. Also, these examples of the various types of "mats" or mat-configurations are not restrictive. No matter how the mat-like means is set up, the integration of the connection means is always possible and quite simple.

As mentioned above, in an alternative to the slip joint connection the elements may also be connected by a flange connection. In this case the connection interfaces are respective flanges arranged at each of the elements, extending into the inner of the respective element, with at least one of the flanges being provided with a channel for accommodating the connection means. This channel, which extends in a radial direction through the flange, is arranged to accommodate the connection means and is therefore open to the inside and to the outside of the tower. As the flange is a very stable, bulky metal ring element, the arrangement of the channel does in no way affect the stability of the flange and therefore the stability of the connection respectively the element itself. It is a quite small channel, as it only needs to accommodate at least one connection means, which itself is quite small in its diameter. If more than one connection means is provided, the channel width may be adapted, or two or more channels may be provided, which are for example evenly distributed around the flange circumference.

The channel itself is a groove, which is open to the adjacent flange. According to this embodiment at least one of the flanges is provided with a groove, which is covered by the opposite flange. This channel or groove can easily be provided in the flange, for example by milling, which can be done already in the factory or even on side during installation. If the flange is a cast item, the channel or groove may also be prepared in the casting process.

If a larger connection means needs to be guided through the flange connection, or if two or more connection means need to be guided through the flange connection, it is also possible that not only one flange is provided with the groove, but that both flanges are provided with the grove, while both grooves complete each other to a larger channel. In this case the adjacent surfaces of the flanges are both provided with a groove, which complete to a larger channel or a double groove having a double size, which allows the accommodation of a larger connection means or of several connection means.

The connection means, however, this connection means is set up, is embedded in a sealing means or seal provided in the space provided between the adjacent conical connection interfaces or in the channel provided in the flange(s). This sealing means may for example be a sealing element, or a hardened sealing means like a silicone sealing or the like. This sealing means tightens the space or channel, if this is necessary.

Finally, the connection means, especially the cable or the pipe, may be fixed by a glue, if the connection means is not an integral part of the mat-like embodiment comprising the slip joint connection. The fixation of the connection means by a glue allows for a very strong and long-lasting fixation of the connection means in the respective area, where it is guided through the slip joint or flange connection.

BRIEF DESCRIPTION

Figure 4:
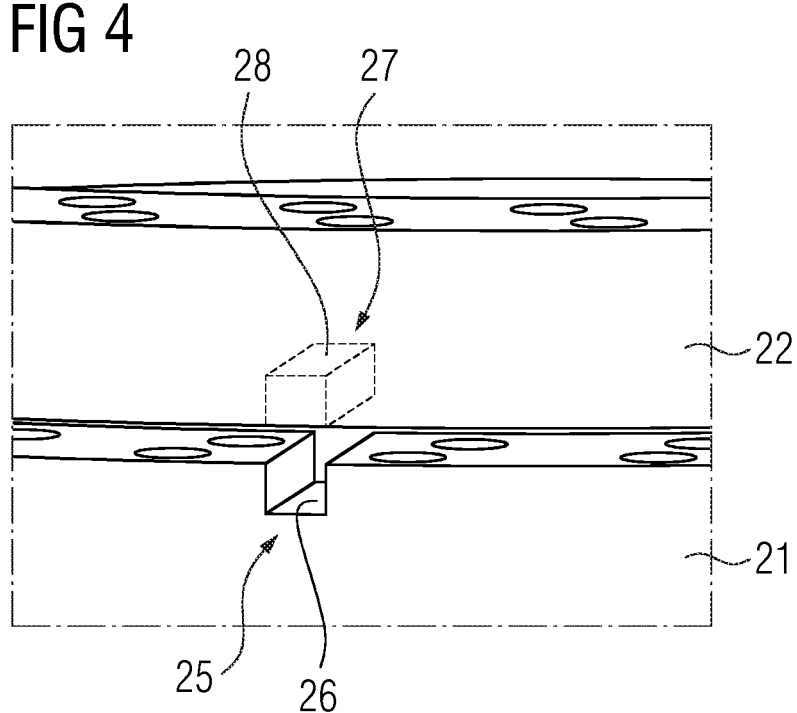
Figure 5:
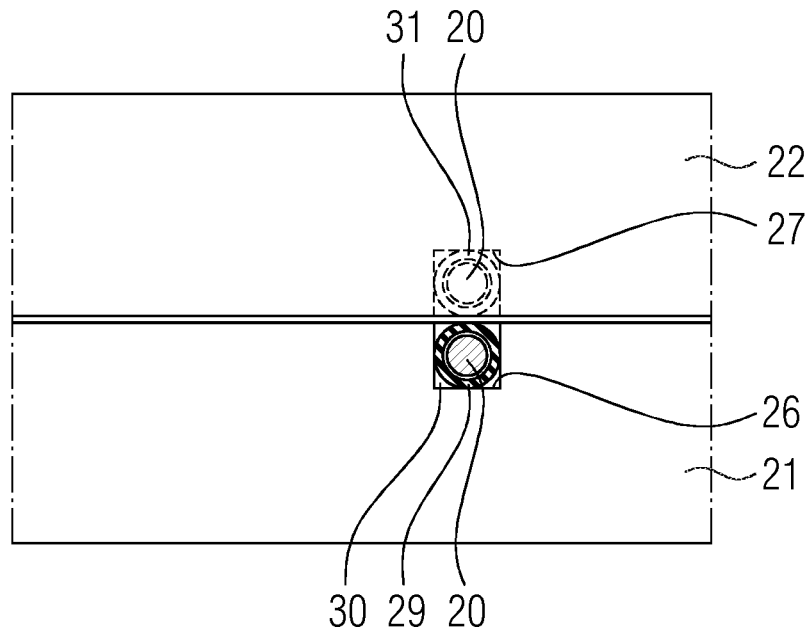
Figure 6:
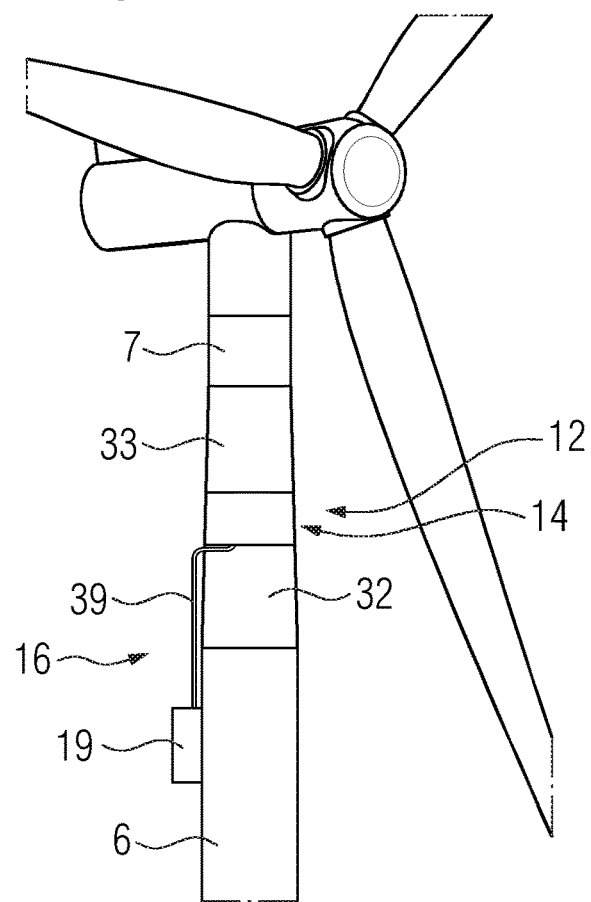
Figure 7:
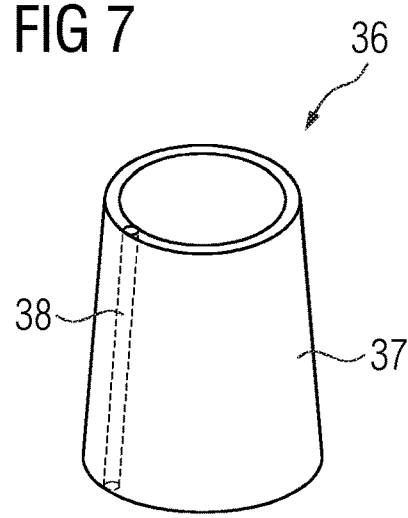
Figure 8:
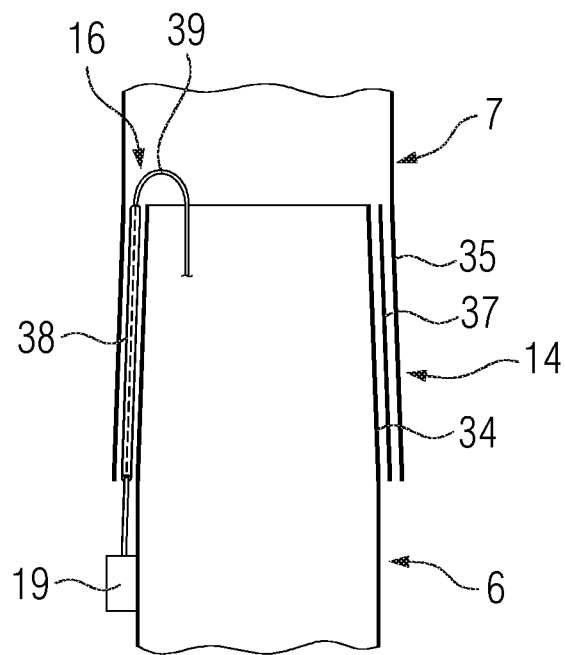
Figure 9:
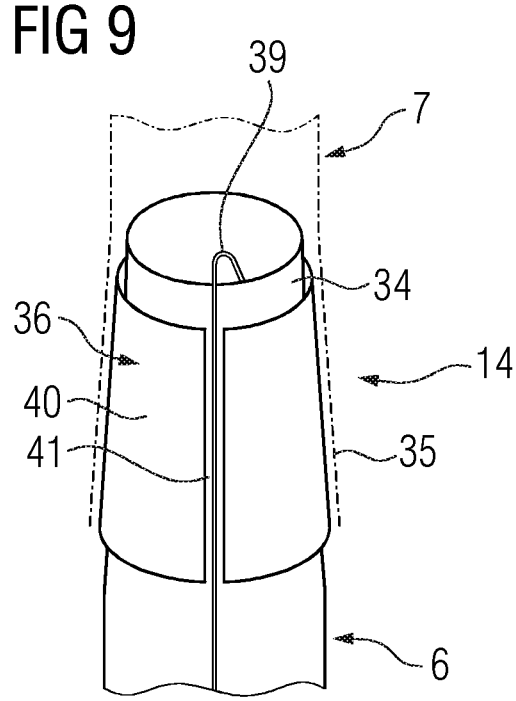

Some of the embodiments will be described in detail, with references to the following Figures, wherein like designations denote like members, wherein:

FIG. 1 a principle sketch of an inventive wind turbine with two different connection types of respective tower elements;

FIG. 2 an enlarged view of the area II of FIG. 1 showing a flange connection with a connection means guided through this flange connection;

FIG. 3 a perspective view of the two flanges of the adjacent tower elements;

FIG. 4 an enlarged view of the area IV of FIG. 3;

FIG. 5 a side view of the flange arrangement of FIG. 4 with an inserted connection means;

FIG. 6 an enlarged view of the area VI of FIG. 1 with a slip joint connection;

FIG. 7 a perspective view of an intermediate flexible mat-like means with an integrated connection means;

FIG. 8 a principle sketch of the arrangement of the mat-like FIG. 7 between two adjacent conical connection interfaces of the tower elements, with an integrated hollow pipe and the connection means guided through this pipe; and FIG. 9 another embodiment of an intermediate mat-like means with a slit between its end edges and with a connection means guided through this slit space.

DETAILED DESCRIPTION

FIG. 1 shows a principal sketch of an inventive wind turbine 1, comprising a foundation element 2 here in form of a monopile 3, which foundation element may alternatively also be a tripod, a suction bucket or a gravity foundation.

The wind turbine 1 further comprises a tower 4 comprising two tower segments 5, 6 attached to each other. The tower 4 further comprises a tower adapter 7, which is attached to the upper tower element 6, to which adapter 7 a nacelle 8 comprising a rotor 9 with the respective blades 10 is attached.

In the embodiment shown in FIG. 1, two connection zones 11, 12 are realized. The first connection zone 11 is realized between the two tower elements 5, 6. The second connection zone 12 is realized between the upper tower element 6 and the tower adapter. In both connection zones 11, 12 different connection types are realized. The connection zone 11 is realized by a flange connection 13, while the connection zone 12 is realized by a slip joint connection 14. Through each connection zone 11, 12 respectively directly through either the flange connection 13 or the slip joint connection 14 a connection means or connector 15, 16 is guided, which connection means for example is a cable or is a hollow pipe. The respective connection means provides a connection from the inside of the tower 4 to the outside of the tower 4, so that the connection means respectively for example the cable, which is guided in the inner of the tower 4 to the connection, is guided through this connection area to the outside. In the shown embodiment for example two lighting devices 18, 19 are arranged at the outside of the tower 4, to which the respective connection means respectively the electric cable is guided.

FIG. 2 shows an enlarged view of the area II of FIG. 1. The figure shows the first connection zone 11 respectively the flange connection 13, by which the lower tower element 5 is connected to the upper tower element 6. As FIG. 2 clearly shows, the connection means 15 here in form of a cable 20 is directly guided through the interface respectively the flange connection, where both tower elements 5, 6 abut each other.

For realising the transfer of the connection means 15 respectively of the cable 20 from the inner of the tower 4 to the outside, at least one of the flanges, which are arranged at the respective ends of the tower elements 5, 6, is provided with a channel, through which the connection means 15 respectively the cable 20 is guided.

FIG. 3 shows the upper end of the lower tower element 5 and the lower end of the upper tower element 6. Each end is provided with a flange 21, 22, which are provided with a plurality of respective bores 23, 24, which accommodate respective bolt connections.

When mounted, the flanges 21, 22 abut each other or are closely adjacent to each other.

For providing a possibility to guide the connection means 15 respectively the cable through this flange interface, in the shown embodiment the flange 21 is provided with a channel 25 in form of a groove 26, see also FIG. 4, extending radially, which groove 26 is open to the adjacent flange 22. The arrangement is shown in detail in FIG. 4, where, as indicated with the dotted line, also the flange 22 may be provided with a channel 27 in form of a respective groove 28, which groove 28 is open to the groove 26 so that they both complement each other to build a larger channel comprising the two grooves 26 and 28 for accommodating a larger connection means 15 or several connection means 15.

The channel 25 (or together with the channel 27) provides a radial guidance or opening to the inside and to the outside of the tower 4, so that it is possible to guide a connection means 15 through this channel.

FIG. 5 shows the possibility that in the groove 26 a hollow pipe 29, may be made of an elastic material, is inserted and fixed there by a sealing means or a glue 30. This hollow pipe works as a guiding means or guide for the connection means and enables a tight seal of the connection means 15 respectively the cable 20 inserted in the pipe 29, it guides and protects the cable 20. So, it is possible to guide the cable 20 from the inner of the tower 4 to the outside, where it is connected to the lighting device 19, or to any other component arranged at the outside of the tower 4. In the inside the cable 20 is connected to a respective other component, whatever and wherever this component may be.

Although the above-mentioned embodiment describes an electric cable 20, it is certainly also possible that the cable 20 is a hollow cable or a hollow pipe used for guiding a liquid, for example a cooling liquid or a hydraulic liquid from a component arranged in the inner of the tower 4 to the component at the outside of the tower.

FIG. 5 also shows the possibility that the second flange 22 is also provided with a respective groove 27 as shown by the dotted line, in which groove 27 another hollow pipe 31 is inserted, accommodating another connection means 15 in form of another cable 20. This embodiment shows that it is easily possible to enlarge the resulting channel by the corresponding grooves 26 and 28.

Aside the shown embodiment, it is certainly also possible to provide several channels 25 respectively grooves 26 distributed around the circumference of only one flange 21 or 22, or to provide several channels or grooves at both flanges 21, 22, if several connection means 15 need to be guided from the inner to the outer of the tower 4.

The stability of the flange connection, as described in regard to the FIGS. 2-5, is not negatively influenced due to the provision of a respective channel(s) or groove(s). The flanges 21, 22 are very stable metal pieces, which are not affected in their stability by providing the small grooves, which have a diameter or square surface adapted to the thickness of the pipe or cable which shall be accommodated in the groove. Thus, a very simple but effective guidance of any kind of connection means from the inner of the tower to the outer of the tower can be realized.

FIG. 6 shows an enlarged view of the area IV of FIG. 1. It shows the upper connection zone 12, which is realized in form of a slip joint connection 14. It comprises a conical connection interface 32 at the upper tower element 6 and a second conical connection interface 33 at the tower adapter 7.

As FIG. 6 shows, the connection means 16 respectively the cable 39 exits the slip joint connection 15 at the lower end of this slip joint connection 14 and runs to the lighting device 19, while also here any other component than the lighting device may be connected via the electric or hollow liquid guiding cable 39.

The cable 39 is guided directly through the space, which is realized between the conical interface 34 provided at the tower element 6 and the conical interface 35 provided at the tower adapter 7, which interfaces 34, 35, see FIG. 8, are adjacent to each other, as the conical interface 34 engages into the outer conical interface 35, when the tower adapter 7 is placed on the tower element 6.

Between both interfaces 34, 35 an intermediate flexible mat-like means 36, which is shown in FIG. 7 in detail, is arranged. This flexible mat-like means is in this embodiment realized in the form of a pre-fabricated conical ring element 37, for example made of a single layer of an elastic polymer like polyurethane or polyamide or the like. When erecting the tower, this mat-like means 36 is slipped over the connection interface 34, whereupon the connection interface 35 is slipped over this arrangement.

As FIG. 7 shows, a hollow pipe 38, which is shown by the dotted line, is integrated respectively embedded in the flexible respectively elastic mat-like means 36. It extends almost vertically and is open to the upper and lower end of the conical mat element 37, as FIG. 7 shows. This hollow pipe 38 is adapted to accommodate the connection means 16 respectively the cable 39. The cable 39 is guided in the inner of the tower 4, as shown in FIG. 8. It runs for example from a component arranged in the lower area of the tower 4 upwards and enters the hollow pipe 38 at its upper end, see FIG. 8. It runs through the hollow pipe 38 and exits at the lower end of the pipe 38 and finally runs to the lighting device 19. As FIG. 8 clearly shows, the cable 39 is directly guided through the mat-like means 36 and thus through the space between both interfaces 34 and 35, which space is realized by the intermediate mat-like means 36, which provides a certain radial distance between both interfaces 34 and 35. No through bore or the like is necessary to be provided in any of the connected elements, as the cable is directly guided through the slip connection zone using the respective space provided between the interfaces 34 and 35.

The diameter of the pipe 38 is smaller than the thickness of the mat element 37, so that it is completely embedded in the elastic mat material. This ascertains that no higher forces are acting on the pipe 38 and thus the cable 39 guided in the pipe 38. However, the pipe 38 may be made of a flexible material that can be compressed without damaging the pipe, while also the cable 39 may be provided with an elastic cover or sheath.

FIG. 9 finally shows another embodiment with a slip joint connection 14 joining the tower element 6 and the tower adapter 7, which adapter is only shown by the dotted line. Also, here an intermediate mat-like means 36 in form of a mat element 40 is arranged, which mat element 40 is provided with the slit 41. This slit extends almost vertically, so that the cable 39 is guided through this slit, as FIG. 9 shows. It enters the slit 41 at its upper end and leaves the slit 41 at its lower end and finally runs to the lighting device 19.

In this embodiment, the cable 39 is directly arranged in the conical circular space between both connection interfaces 34 and 35, it is not guided in a hollow pipe, but it certainly could be accommodated in a hollow pipe which would then also be arranged in the slit 41. Although not shown, it is possible to fix the cable 39 by a glue or a sealing directly in the slit 41.

Also, here the cable 39 is guided directly through the connection zone respectively the space between the interfaces 34 and 35. Not drilling holes or the like are necessary for guiding the connection means respectively the cable from the inside to the outside. The stability of the slip joint connection is not influenced in a negative way due to the guiding of the connection means 15 through the connection area, as the connection elements are not worked to provide any guiding holes or channels etc.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements

The invention claimed is:

1. A wind turbine comprising a tower, wherein the tower includes at least one hollow construction having at least two longitudinal hollow elements, wherein each of the at least two longitudinal hollow elements has a connection interface for connecting the at least two longitudinal hollow elements by a slip joint connection, wherein at least one connector is guided through the slip joint connection from an inner space to an outer space of the wind turbine, wherein at least one connection interface includes adjacent conical connection interfaces that form a slip joint connection, wherein at least one intermediate flexible mat-like means is arranged between the adjacent conical connection interfaces, wherein the mat-like means is (i) a one-piece conical ring-shaped slitted mat element having a slit between adjacent edges of the slitted mat element or (ii) two or more mat elements arranged in a ring form, wherein the connector is guided through the mat-like means between the adjacent conical connection interfaces from the inner space to the outer space, and wherein the connector is arranged in the slit of the slitted mat element or in a space between adjacent ends of the two or more mat elements.

2. The wind turbine according to claim 1, wherein the mat-like means is the two or more mat-like elements arranged in the ring form and the two or more mat-like elements are arranged equidistant around a circumference of the adjacent conical connection interfaces.

3. The wind turbine according to claim 1, wherein the connector comprises a cable directly inserted in the slit of the slitted mat element or in the space between the adjacent ends of the two or more mat elements, or that the connector comprises a hollow pipe in the slit of the slitted mat element or in the space between the adjacent ends of the two or more mat elements.

4. The wind turbine according to claim 3, wherein an outer diameter of the connector of the cable or the pipe is smaller than a thickness of the mat-like means.

5. The wind turbine according to claim 1, wherein the connector is embedded in a seal provided in the slit of the slitted mat element or in the space between the adjacent ends of the two or more mat elements.

6. The wind turbine according to claim 1, wherein the mat-like means is the slitted mat element and wherein the connector is fixed directly in the slit by a glue.

* * * * *